(12) United States Patent
Thiesmann et al.

(10) Patent No.: US 12,433,200 B2
(45) Date of Patent: Oct. 7, 2025

(54) AGRICULTURAL WORK MACHINE AND METHOD TO OPERATE AN AGRICULTURAL WORK MACHINE

(71) Applicant: CLAAS Selbstfahrende Erntemaschinen GmbH, Harsewinkel (DE)

(72) Inventors: Waldemar Thiesmann, Osnabrück (DE); Klaus Albers, Hörstel (DE); Robert Beck, Warendorf (DE); Stefan Galland, Harsewinkel (DE); Jan Geiger, Osnabrück (DE); Ingo Kirchbeck, Oelde (DE); Michael Losch, Versmold (DE); Michael Piontek, Suesel Zarnekau (DE); Peter Juerschik, Gütersloh (DE); Dennis Neitemeier, Lippetal (DE); Eckehard Jeppe, Zierenberg (DE); Reinhard Frenser, Rheda-Wiedenbrück (DE); Joachim Baumgarten, Beelen (DE); Bastian Bormann, Gütersloh (DE); Andreas Wilken, Bissendorf (DE); Maik Heufekes, Münster (DE); Matthias Domnik, Oelde (DE); Marvin Barther, Steinhagen (DE); Johann Witte, Fröndenberg (DE); Maximilian Schröder, Gütersloh (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 278 days.

(21) Appl. No.: 18/119,440

(22) Filed: Mar. 9, 2023

(65) Prior Publication Data

US 2023/0286383 A1 Sep. 14, 2023

(30) Foreign Application Priority Data

Mar. 10, 2022 (DE) .......................... 102022105594.9

(51) Int. Cl.
*B60K 35/00* (2024.01)
*A01D 90/10* (2006.01)
(Continued)

(52) U.S. Cl.
CPC .............. *B60K 35/00* (2013.01); *A01D 90/10* (2013.01); *B62D 33/0617* (2013.01);
(Continued)

(58) Field of Classification Search
CPC .. B62D 33/067; B62D 33/0617; A01D 90/10; B60K 35/00; B60K 35/81; B60K 2360/77; B60K 35/28; B60K 35/60; B60K 2360/16
See application file for complete search history.

(56) References Cited

U.S. PATENT DOCUMENTS

| 2014/0053092 A1* | 2/2014 | Grevinga .............. G06F 3/0485 |
| | | 715/781 |
| 2018/0277067 A1* | 9/2018 | Tentinger ................ G06F 3/012 |

(Continued)

FOREIGN PATENT DOCUMENTS

| DE | 20013646 A1 | 12/2000 |
| EP | 1674324 A1 | 6/2006 |
| EP | 3794927 A1 | 3/2021 |

OTHER PUBLICATIONS

European Search Report for European Patent Application No. 23153458.7 dated Oct. 23, 2023.

*Primary Examiner* — Andrea C Leggett
(74) *Attorney, Agent, or Firm* — Lempia Summerfield Katz LLC

(57) ABSTRACT

An agricultural work machine and a method for operation an agricultural work machine are disclosed. The agricultural work machine includes a driver's cab with an interior space spatially partially delimited by a front window and at least one side window, a driver's seat arranged in the interior space, an input device for entering input by an operator, a visualization system for visualizing information for an operator sitting on the driver's seat, and a control device which is communication with the visualization system. The control device controls the visualization system in such a way that process information relevant to the selected work process is visualized.

20 Claims, 11 Drawing Sheets

(51) Int. Cl.
*B62D 33/06* (2006.01)
*B60K 35/28* (2024.01)
*B60K 35/60* (2024.01)
*B60K 35/81* (2024.01)

(52) U.S. Cl.
CPC .............. *B60K 35/28* (2024.01); *B60K 35/60* (2024.01); *B60K 35/81* (2024.01); *B60K 2360/16* (2024.01); *B60K 2360/77* (2024.01)

(56) References Cited

U.S. PATENT DOCUMENTS

2019/0126823 A1* 5/2019 Smith .................... B60K 35/60
2020/0363780 A1* 11/2020 Van Zadelhoff ...... H04L 67/025

* cited by examiner

AGRICULTURAL WORK MACHINE AND METHOD TO OPERATE AN AGRICULTURAL WORK MACHINE

CROSS REFERENCE TO RELATED APPLICATION

This application claims priority under 35 U.S.C. § 119 to German Patent Application No. 102022105594.9 filed Mar. 10, 2022, the entire disclosure of which is hereby incorporated by reference herein.

TECHNICAL FIELD

The present application relates to an agricultural work machine and a method for operating an agricultural work machine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

The work machine, which may comprise a combine harvester or a forage harvester, may include a driver's cab with an interior space which is spatially delimited at least partially by a front window and at least one side window. The side windows may comprise side windows of the driver's cab and a rear window of the driver's cab. Typically, the interior space is delimited by the front window and two side windows each adjoining the front window. The interior space is typically also delimited at the bottom by a floor, at the top by a roof, and on a side opposite the front window by a rear wall. A driver's seat may be arranged or positioned in the interior space, on which an operator of the work machine may sit. Furthermore, the work machine may comprise an input device through which the operator may enter input. The input device may be designed with one or more input elements (such as a plurality of input elements) which are arranged or positioned in spatial proximity or relative to the driver's seat, such as on the driver's seat (e.g., positioned on an armrest of the driver's seat). For example, it is contemplated that the input device comprises a multi-function control lever, a keyboard, a joystick and the like. Also, at least one input element may be formed by a touch display that is simultaneously suitable for entering input as well as for visualizing information through graphical elements (e.g., visualizing output).

Furthermore, the work machine may include a visualization system through which information may be visualized for the operator. The visualization system may generally be designed in such a way that the information may be particularly well-perceived visually by an operator sitting on the driver's seat. In particular, the visualization system may have at least one display, for example in the form of a liquid crystal (LC) display, which may be oriented relative to the driver's seat so that the operator sitting in the driver's seat may read the display very easily. Furthermore, the visualization system may have at least one window display through which information may be visualized in or on a window. Such a window display may, for example, be formed by a window display laminated into a window or have a projector through which information is projected onto the window in the manner of a head-up display.

To control the visualization system, the work machine may also comprise a control device which is electronically connected to or in communication with the visualization system in a data-transmitting manner. The control device may be configured to control the visualization system in such a way that information which the operator may perceive is visualized through the visualization system. Furthermore, the input device may be connected to the control device so that entered inputs may be transmitted to the control device. These inputs may then be processed through the control device, whereby at least one work process of the work machine may be selected through the control device. For example, it is contemplated that the operator may use an input to cause a harvesting process to be selected as the work process for the work machine.

A work machine is disclosed in EP 3 794 927 B1, which is incorporated by reference herein in its entirety, and describes a work machine that is equipped with a visualization system and a control device. Furthermore, the work machine comprises an eye monitoring system by which a viewing direction of the operator may be detected. As discussed therein, the visualization of information may depend on a viewing direction of the operator. In this way, it is possible to visualize (such as to always visualize) the information in the field of vision of the operator

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
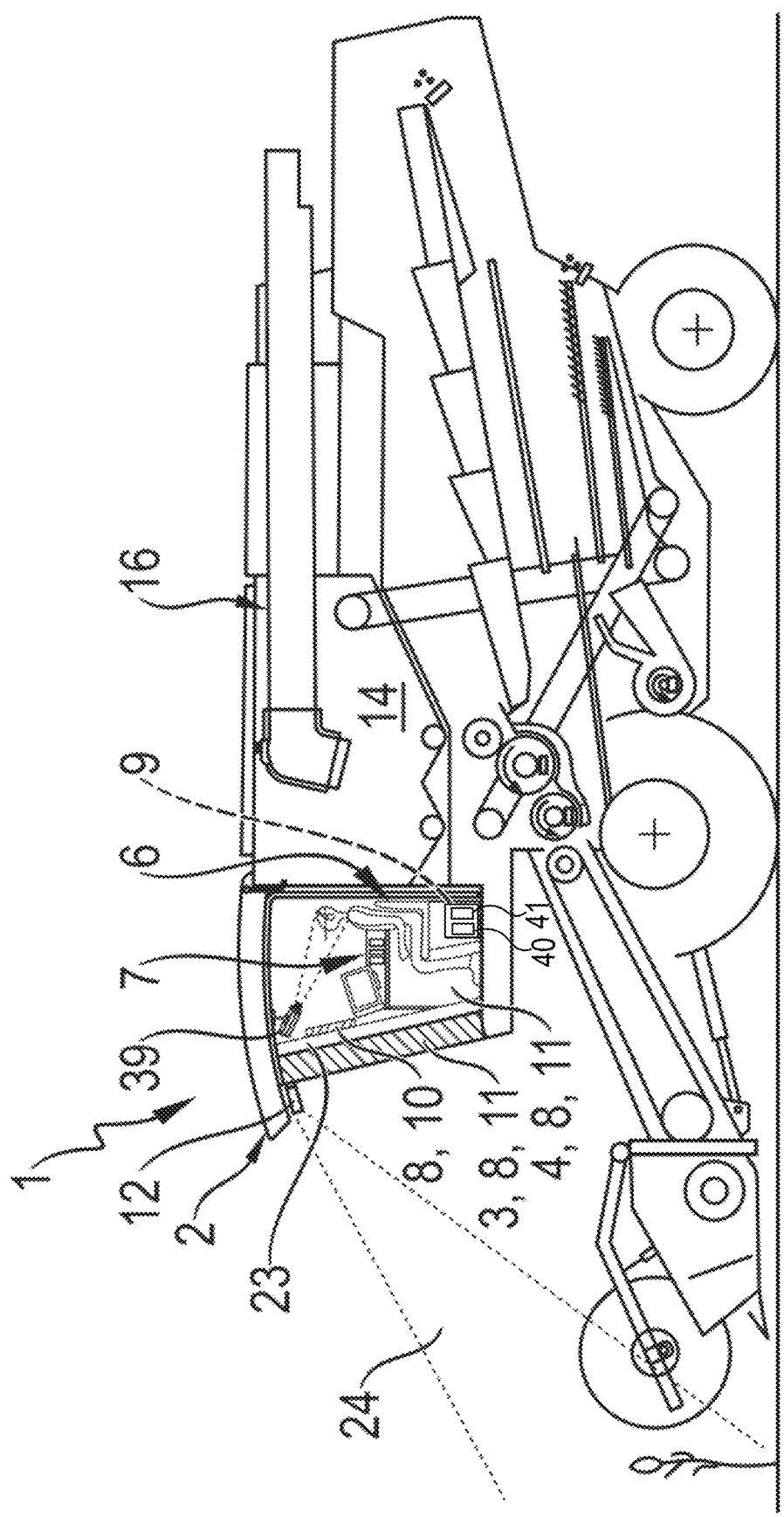
FIG. 1 illustrates a cross-section through a work machine according to the invention.
Figure 2:
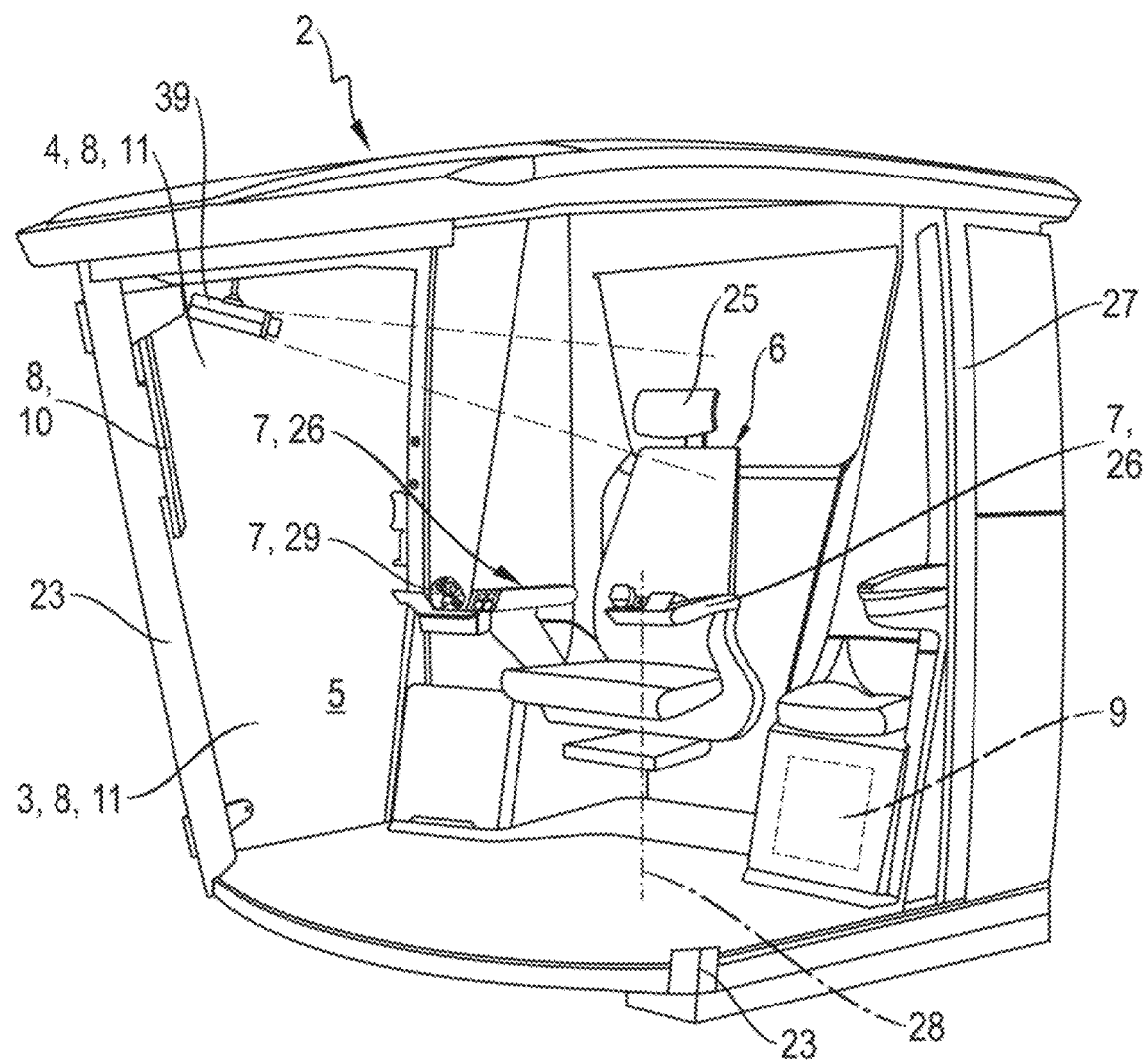
FIG. 2 illustrates a detail of a driver's cab of the work machine according to FIG. 1.
Figure 3:
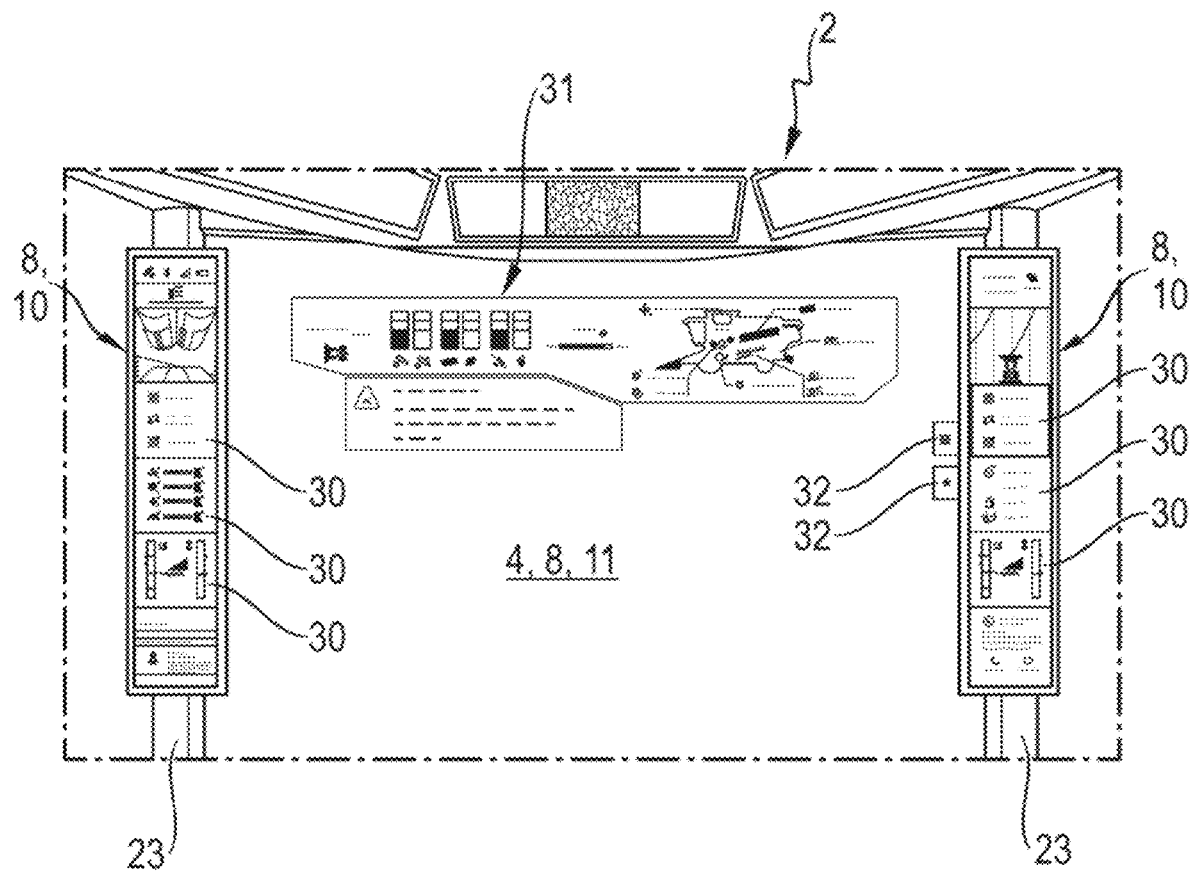
FIG. 3 illustrates a view of a visualization system of the work machine according to FIG. 1.
Figure 4:
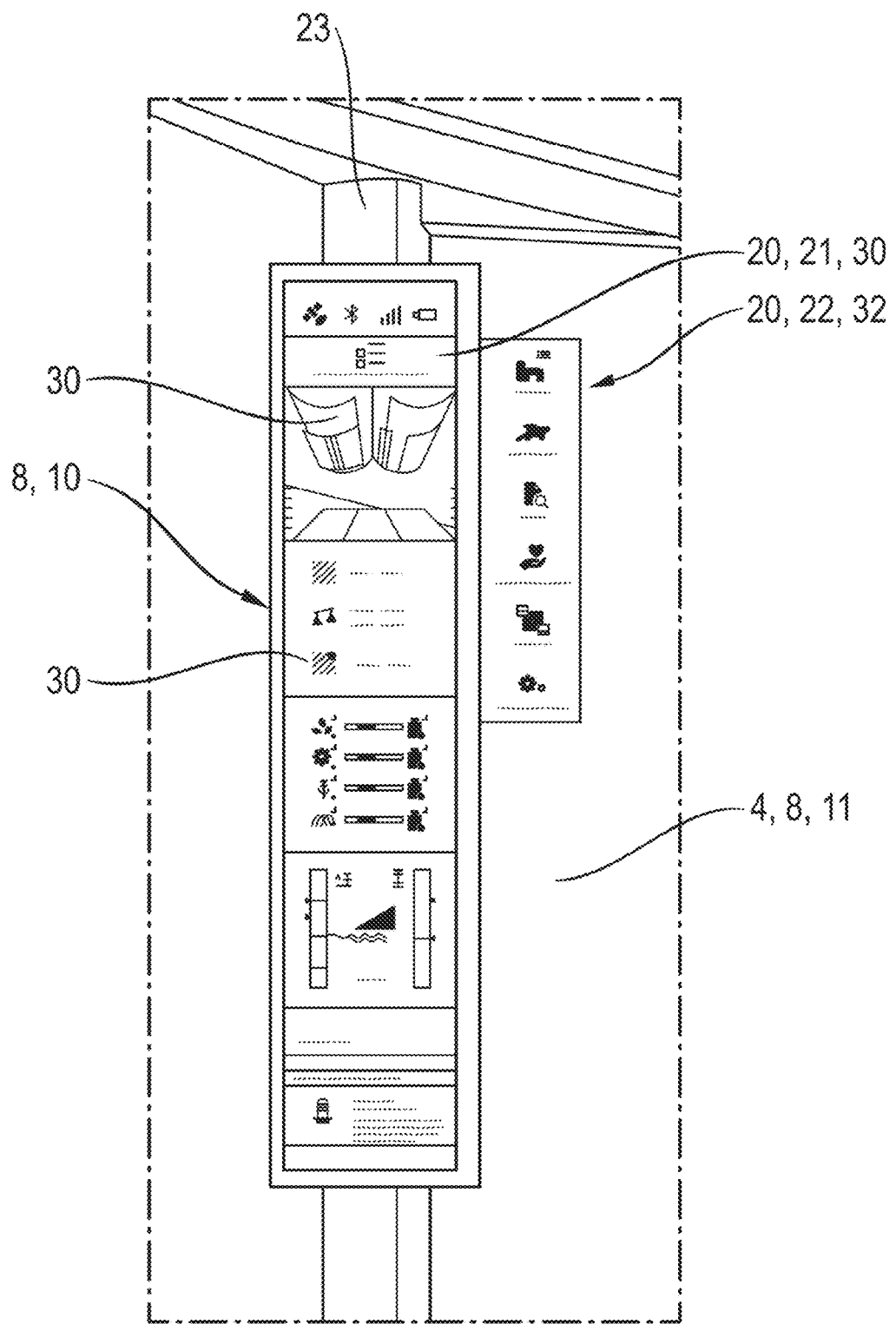
FIG. 4 illustrates a detail of a display of the visualization system according to FIG. 3.
Figure 5:
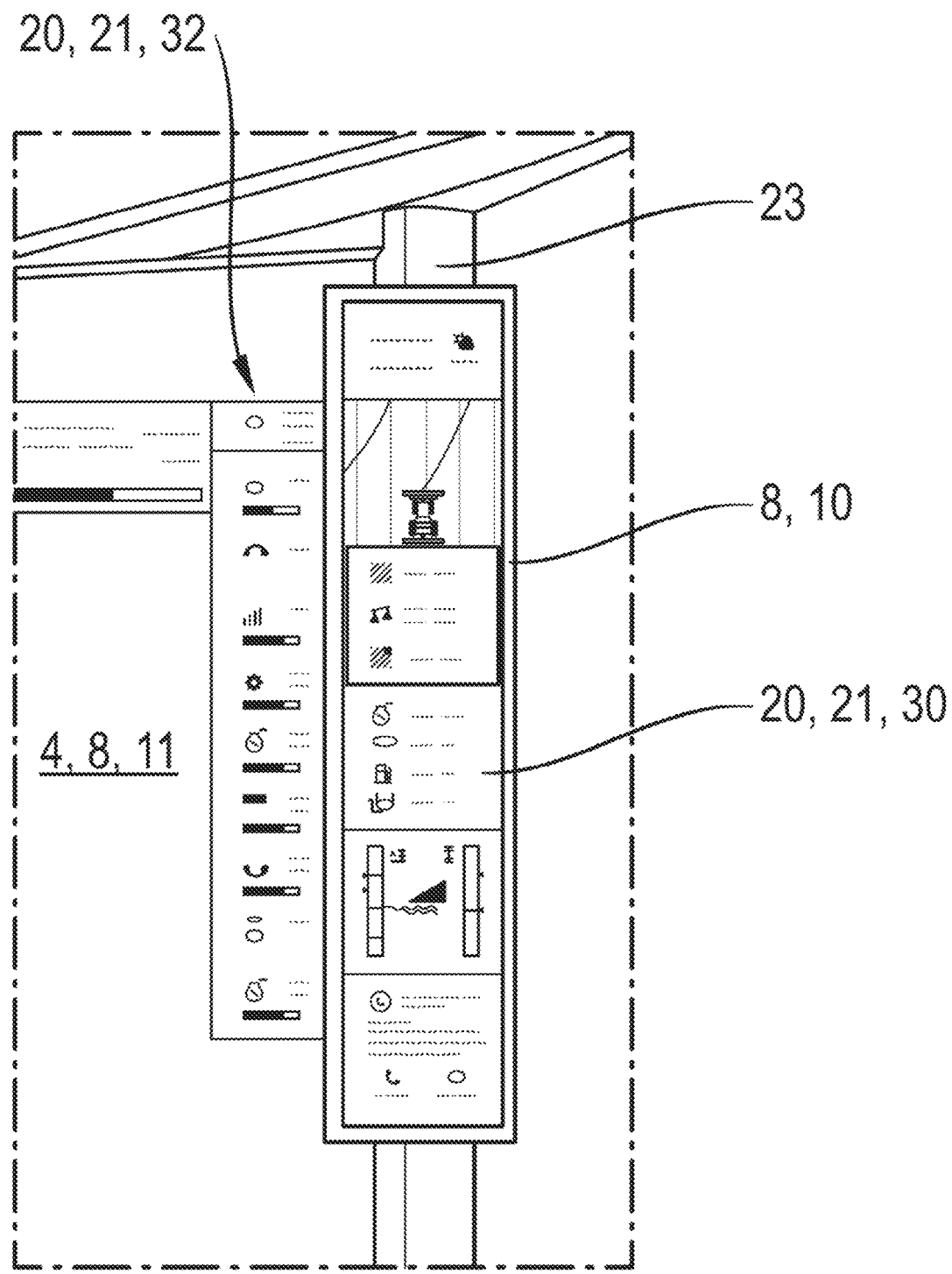
FIG. 5 illustrates another detail of a display.
Figure 6:
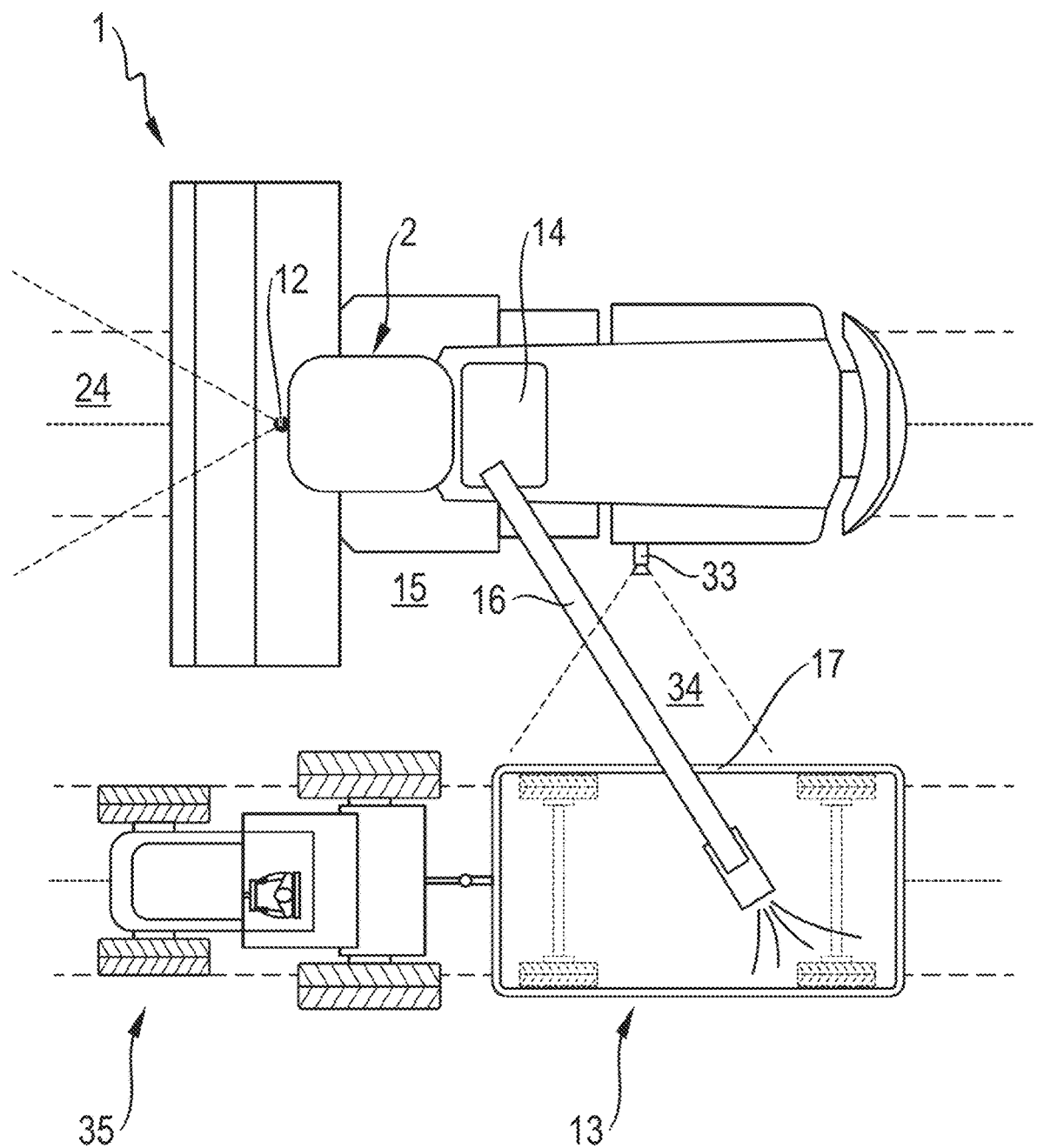
FIG. 6 illustrates a schematic plan view of the work machine according to FIG. 1 which is involved in a transfer process.

As discussed in the background, the operator may be shown various information. However, this may be problematic in that the operator may be shown a great deal (such as an excessive amount) of information that is typically only partially of interest to the operator for a given operating situation. In other words, the density of information that the operator has to keep in view may be so great that this may lead to resignation or information overload, which may ultimately result in the information being ignored. This is considerably disadvantageous if essential information is also ignored by the operator who then fails to perform activities or settings, or performs them incorrectly.

Thus, in one or some embodiments, a method and apparatus are disclosed that is configured to simplify the visualization of information for the operator.

In one or some embodiments, the control device is configured to control the visualization system in such a way that information relevant to the selected work process ("process information") is always visualized. In particular, the control device may be configured to also control the visualization system in such a way that other information that is irrelevant for the selected work process is visualized only in a less eye-catching form, or not at all.

The work machine may have one or more advantages. In particular, the work machine may allow for a reduced display of information depending on a selected work process. The operator may select this manually through the input device. Alternatively or additionally, an automatic selection of a work process is also contemplated, for example depending on any one, any combination, or all of: a conscious or subconscious action of the operator; at least one operating parameter of the work machine; or at least one harvesting parameter. For example, it is contemplated that, in the presence of a filled grain tank of a work machine designed as a combine harvester and after a threshing device of the combine harvester has been switched off, a transfer process is automatically selected as a work process through the control device, in which the work machine is operated to transfer harvested material from the grain tank to a transport vehicle. It is alternatively or additionally possible to manually select such a work process (e.g., via manual input), for example by using an operating element. As a result of the reduced display of the process information, it may be significantly easier for the operator to maintain an overview of the selected work process as well as an operating state of the work machine and to make well-founded decisions concerning the operation of the work machine without being exposed to the feeling of being overloaded with information.

In one or some embodiments, in addition to (or instead of) selecting the work process, at least one context of the selected work process is selectable. This may be done either automatically through the control device and/or as a result of a manual input through the input device. The control device may be configured to control the visualization system in such a way that process information for the selected work process is visualized depending on the selected context. This may be performed in such a way that the process information is visualized in a prioritized manner, such as only depending on the selected context. For example, it is contemplated that the operator may select the work process "threshing" for a work machine formed by a combine harvester; in response to the operator selection of the work process "threshing", the visualization system may be controlled so that only process information relevant to this work process is visualized. The operator may then select the cutting unit as the context for the "threshing" work process; in response to the operator selecting the cutting unit as the context for the "threshing" work process, the visualization system is controlled by the control device in such a way that, for the time being, only process information in the "cutting unit" context is visualized for the "threshing" work process. This can, for example, concern a crop flow of harvested material in the cutting unit as well as corresponding data regarding the current through-put and the like. Other process information that may equally concern the "threshing" work process, for example an operation of the threshing device or a separating device, is either not visualized at all or only reduced after the "cutting unit" context has been selected. In this way, the operator may easily visualize process information that is relevant for a current situation, depending on his/her interests and, if necessary, on what is needed. This may additionally simplify the operation of the work machine.

In particular, it is contemplated that the context for a work process may be automatically selected through the control device. This may be performed, for example, as a result of information that the control device receives from at least one sensor device. For example, it is contemplated that an operating parameter of the combine harvester is monitored through a sensor device. Responsive to the control device determining that a value associated with the operating parameter lies outside a given or predetermined target range, the control device may highlight this to the operator, such as bringing the associated part of a particular work process specifically into the focus of the operator. Using the example of the cutting unit, it is contemplated that responsive to the control unit detecting an increased drive torque of a screw conveyor of the cutting unit, the control unit may automatically select the cutting unit as the context of the "threshing" work process. The associated process information may then be visualized for the operator in a prioritized manner, such as exclusively, so that the operator may obtain an impression of an operating state of the cutting unit and, if necessary, take action.

In one or some embodiments, the work machine comprises an eye monitoring system through which information relating to at least one eye parameter, such as a viewing direction of the operator, may be detected.

This information may be transmitted (e.g., wired and/or wirelessly) to the control device and evaluated through the control device. In this case, the control device is configured to control the visualization system in such a way that the process information relating to the work process and, if applicable, a selected context is visualized depending on the information acquired through the eye monitoring system. The eye monitoring system may include at least one camera whose cone of vision is directed at a head area of the driver's seat.

In this way, it is possible through the camera to optically detect a direction of gaze and one or more other eye parameters for an operator sitting on the driver's seat. The process information relevant to the work process may then be visualized depending on the information detected through the eye monitoring system. In particular, a location of the visualization and/or an object of the process information may be influenced. Therefore, in one or some embodiments, it may be advantageous if the process information may be visualized in such a way that it is located as continuously as possible in the operator's field of vision. If, for example, the operator turns his gaze to the side in the direction of one of the side windows, it may be particularly advantageous, for example, if the visualized process information is visualized on the side window following the direction of gaze through a window display of the visualization system. It is also contemplated that when the operator looks in a certain direction, certain subsets of the process information visualized for the work process and, if applicable, the selected context are prioritized or even displayed exclusively. It is therefore contemplated for example that, when the operator looks downward to the left in the direction of a left end of the reel of the cutting unit of a work machine designed as a combine harvester, process information relating to the reel or, for example, to a line laser of the work machine arranged or positioned in said area may be primarily visualized for the operator. In this regard, the direction of the gaze of the operator (as determined by the eye monitoring system) may be used to determine which part (e.g., the reel or the line laser) of the agricultural work machine the operator is gazing at. In turn, the control device may select process information (e.g., gaze-detected process information) associated with the part of the agricultural work machine the operator is gazing at for visualization.

In one or some embodiments, the control device is configured to control the visualization system in such a way that information, such as process information, is visualized in combination by the display and by the window display. In this case, the information that is visualized by the display and the window display may form an information unit. Such an information unit may be characterized in that the pieces of information of the information unit are directly related to each other in terms of content. For example, it is contemplated that a first part of process information about a selected context is visualized by the display, and a second part is visualized by the window display. The combined visualization by the display and the window display may enable a particularly seamless visualization of information. In this regard, it is contemplated, for example, that the front support pillars of the driver's cab (A-pillars), which may be arranged or positioned at the opposite ends of the front window, each interact with a display that is attached to the support pillars. In this way, the displays may make the respective support column visually accessible to the operator so that visualized information may be perceived when looking at the respective support column. A combination of the visualization of information through such a display and a surrounding front window and, if necessary, a side window likewise adjoining the support column may provide the operator with a continuous (e.g., uninterrupted or seamless) optical surface on which information may be visualized.

In one or some embodiments, the work machine may also comprise at least one sensor, such as a camera and/or a laser through which an environment of the work machine may be observed. This may allow visual information about the environment to be detected. This information may be transmitted (e.g., wired and/or wirelessly) from the sensor to the control device, wherein the control device is configured to visualize the visual information for the operator through the visualization system. In one or some embodiments, the control device is also configured to at least partially change the visual information that has been acquired through the at least one sensor. In this way, modified visual information may be generated that may be visualized for the operator through the visualization system. In particular, this may be process information. In this way, real visual information may be supplemented and/or replaced with virtual elements according to the principle of "augmented reality", whereby relevant information may be visualized for the operator in a particularly simple and accessible manner. For example, it is contemplated that opaque components, which may be a part of the agricultural work machine and/or transport vehicle such as a floor panel or a wall, may be made virtually transparent so that the operator gets the impression that he may look through the opaque component. It is therefore contemplated that the operator may visually monitor the fill level of a transport vehicle by visualizing a wall of the transport vehicle in a virtually transparent manner, whereby the operator may immediately see how far the transport vehicle has already been filled with the respective transferred crop. In one or some embodiments information on the fill level of the transport vehicle may be recorded through additional sensors.

The underlying task may also be achieved through a method. The method may be characterized in that the visualization system is used to visualize information that is relevant for a respectively selected work process ("process information"). In one or some embodiments, the method may be particularly easy to execute through the work machine according to the invention. The resulting advantages have already been presented above. In particular, it is possible to display to the operator process information that is specifically relevant to a selected work process, which conversely means that less relevant or even irrelevant process information is not displayed. This may make it easier for the operator to obtain an overview of the many pieces of process information typically associated with the operation of a particular work machine.

The method may be advantageous when process information is visualized depending on a selected context of the selected work process. The particular context may be selected automatically, such as through the control device, and/or manually by the operator, such as by using the input device. The visualization of the process information for a particular work process in the particular selected context may help further reduce and therefore improve the clarity of the visualized process information which, overall, simplifies the operation of the work machine for the operator.

In one manner, the process information may be visualized depending on a viewing direction of the operator. This may be performed with respect to a visualization location and/or an object of the visualized process information. The considerations associated with this have already been explained above. In particular, it is possible to select the context of a selected work process depending on a direction of gaze of the operator, wherein the direction of gaze of the operator is interpreted to mean that the operator is interested, for example, in a component or an environment to which she/he directs her/his gaze.

In one or some embodiments, when a work process formed by a transfer process for transferring harvested material onto a transport vehicle is selected, process information relevant to the transfer process may be visualized for the operator. In particular, it is contemplated that process information concerning a fill level of the transport vehicle and/or concerning a fill level of a grain tank of the work machine is visualized for the operator. A context of the "transfer" work process may be selected, for example, through a manual entry or automatically depending on a viewing direction of the operator. In particular, it is contemplated that process information concerning a throughput of harvested material through a particular transfer device is visualized in the field of vision of the operator through a window display when the operator looks laterally through the particular side window toward the transfer device. In this example, process information on the "transfer" work process is therefore specifically visualized for the operator in the "transfer device" context, whereby the context is automatically selected through the control device depending on information that is recorded through an eye monitoring system.

In addition or alternatively, it may be particularly advantageous if visual information fed to the control device is modified, and modified visual information is generated as a result. This information may then be visualized for the operator through the visualization system. Visual information may be detected in particular through at least one sensor as described above. It is also contemplated that information may be made available from a central database, such as via a database communicating via the Internet. For example, it is contemplated that aerial photographs or satellite images of a field to be worked by the work machine are retrieved, wherein the corresponding visual information may be enriched, added, or modified with graphical elements. These can, for example, contain information on a yield that was determined in different areas of the field in the previous year. In this way, the operator may receive comparative data that she/he may use for the remaining harvesting process. Other types of information may also be processed and visualized, for example information concerning mapped obstacles.

In one or some embodiments, visual information, such as that detected through at least one sensor, is modified in such a way that part or all of the opaque components are visualized transparently at least partly (such as completely). As previously illustrated using the example of a transfer process, it may be particularly advantageous, for example, to transparently visualize a wall of a particular transport vehicle to which harvested material is transferred. In this way, the operator may virtually "look" through the wall of the transport vehicle and visually monitor a fill level of the transport vehicle. This may relate on the one hand to an absolute filling of the transport vehicle, and on the other hand to a distribution of the transferred harvested material on the transport vehicle. It is also contemplated that recommendations for action may be visualized for the operators, such as through virtual graphic elements. This may, for example, be a recommendation to relocate the transfer device relative to the transport vehicle which may be visualized, for example, through a virtual direction indicator, such as a virtual arrow.

In one or some embodiments, the visual information may be modified in such a way that at least one object and/or area detected through the sensor is visualized in a modified form compared to a real shape or a real component. The modified form may comprise (or consist of) a color and/or outline of individual areas. For example, it is contemplated that visual information detected through a sensor in the form of a camera is sent to the control device and evaluated thereby. Responsive to the control device identifying one or more objects (e.g., using pattern recognition), with the one or more objects being relevant for the particular work process of the work machine, these one or more objects may be highlighted in the visualization for the operator in a modified form (e.g., the image generated by the camera may be modified by overlaying a box, a circle, or the like at the respective section(s) in the image where the one or more objects that have been identified are present). For example, in a harvesting process of a work machine designed as a combine harvester, this may concern an animal or the like located in a headland area of the work machine. In the image that includes the animal, the image may be modified to highlight the animal, such as by drawing a box around a part (or all) of the animal, by drawing an outline around the animal, or the like. In this way, changing the visual information may make it easier for the operator to recognize corresponding content so that reaction times may be shortened and urgencies may be emphasized.

In one or some embodiments of the method, one or more pieces of information may be visualized in combination on at least one display of at least one window display of the visualization system. In this case, visualization areas of the display and the window display may be logically connected to each other in such a way that at least a first part of content visualized through the visualization system is visualized by the display, and another part is visualized by the window display. The method may have the particular advantage that information at a visual transition from a particular display to the window display is presented seamlessly so that a uniform image results for the operator which she/he may visually perceive very easily and process accordingly.

In one or some embodiments, various operator interactive inputs may be output across multiple displays. One example of an operator interactive input comprises a menu in which a first part of an operating menu is visualized by the display, and a second part of the same operating menu is visualized through the window display. This embodiment may have the particular advantage that both parts of the operating menu, such as a main part on the display and a secondary part on the window display, may be continuously visualized for the operator for operating the particular operating menu without the operator having to change her/his viewing direction to simultaneously perceive both parts. This is typically the case when different parts of an operating menu are visualized on displays spaced apart from each other that require the operator to change his viewing direction if she/he wants to switch from one part to the other. Alternatively, when a secondary part of an operating menu, in particular a submenu, is accessed, it may be customary to visualize the previously displayed main part of the operating menu in a reduced size or not at all. This is also detrimental to operating comfort. The combined visualization through a display and a window display may avoid these disadvantages.

Referring to the figures, various embodiments are shown in FIGS. 1 to 11, which comprises an agricultural work machine 1. The agricultural work machine 1 may comprise a combine harvester. This is particularly well illustrated by FIGS. 1 and 6. The agricultural work machine 1 comprises a driver's cab 2 which comprises a structurally limited interior space 5. This is delimited at the front of the agricultural work machine 1 by a front window 3 and at the sides by side windows 4. A driver's seat 6 is arranged or positioned in the interior space 5 of the driver's cab 2 on which an operator may sit. The driver's seat 6 may be aligned or positioned relative to the front window 3 and the side windows 4 in such a way that an operator sitting on the driver's seat 6 directs his/her view forward through the front window 3.

The agricultural work machine 1 may also comprise a visualization system 8 comprising a plurality of components. In the depicted example, the visualization system 8 comprises two displays 10, which are designed here in the form of LC displays, and a plurality of front window displays 11. The latter are formed here by display films, one of which may be laminated into each of the side windows 4 and the front window 3. Through the window displays 11, information may be visualized directly in the area of the particular window. The displays 10 may be arranged or positioned on A-pillars 23 of the driver's cab 2 as may be seen particularly well from FIGS. 2 and 3.

The agricultural work machine 1 may also comprise a control device 9, which in the depicted example comprises a data processing system. The control device 9 may comprise at least one processor 40 and at least one memory 41 that stores information and/or software, with the processor configured to execute the software stored in the memory. In one or some embodiments, the control device 9 may comprise any type of computing functionality, such as the at least one processor 40 (which may comprise a microprocessor, controller, PLA, or the like) and the at least one memory 41. The memory 41 may comprise any type of storage device (e.g., any type of memory). Though the processor 40 and the memory 41 are depicted as separate elements, they may be part of a single machine, which includes a microprocessor (or other type of controller) and a memory. Alternatively, the processor 40 may rely on memory 41 for all of its memory needs.

The processor 40 and memory 41 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The above discussion regarding the at least one processor 40 and the at least one memory 41 may be applied to other devices, such as the visualization system 8 or the eye monitoring system 39.

In one or some embodiments, the visualization system 8 is in communication with the control device 9 in a data-transmitting manner, wherein the control device 9 is configured to control the visualization system 8 (e.g., the control device 9 sends one or more commands in order to control what information the visualization system 8 outputs and/or how the visualization system 8 outputs the information). In this way, information may be visualized for the operator through the visualization system 8.

Furthermore, the agricultural work machine 1 may comprise an input device 7 which in the shown example comprises one or more input elements. In one or some embodiments, the input device 7 comprises a control lever 29 which has a plurality of switches. Alternatively, or in addition, the input device 7 may comprise further input elements which are directly integrated in armrests 26 of the driver's seat 6. In one or some embodiments, the input device 7 is in communication with the control device 9 in a data-transmitting manner so that entries made through the input device 7 may be transmitted to the control device 9 and processed through the control device 9. In particular, the control device 9 may be configured so that a work process of the agricultural work machine 1 may be selected through or using the input device 7. For example, the control device 9 may set the agricultural work machine 1 to be operated in a threshing process or a transfer process.

In one or some embodiments, the agricultural work machine 1 may also comprise an eye monitoring system 39, which in the depicted example comprises a camera. The eye monitoring system 39 may be directed or angled towards a headrest 25 of the driver's seat 6 so that part of the eye of an operator sitting on the driver's seat 6 may be detected through the eye monitoring system 39. Furthermore, the agricultural work machine 1 may comprise a sensor 12, which may comprise a camera. In the shown example, the sensor 12 is arranged or positioned on a roof of the driver's cab 2 and has a viewing cone 24 which is directed towards a headland area of the agricultural work machine 1.

In one or some embodiments, the agricultural work machine 1 comprises a plurality of sensors which are not shown in FIG. 1. The sensors may each be in communication with the control device 9 so that information which is detected through the sensors may be transmitted to the control device 9 and processed thereby. This processing is done, among other things, in such a way that the control device 9 controls the visualization system 8 to visualize information for the operator. This may be done, for example, in a manner illustrated in FIGS. 3 to 5. In so doing, various graphic elements 30, 31, 32 are visualized by the displays 10, which may be arranged or positioned on the A-pillars 23, and through the window displays 11 which may be laminated into or on the front window 3. These graphic elements 30, 31, 32 may represent process information concerning a work process of the agricultural work machine 1, which may be visually perceived by the operator. In this way, the operator may recognize problems, make changes, and make decisions. In one or some embodiments, the process information is visualized for a selected work process, wherein the visualized process information is relevant for the selected work process.

The control device 9 may select the work process in one or more ways, such as based on one or both of a manual input (via the input device 7) of the operator or based on automatic analysis by the control device 9. Thus, in the depicted example, the operator may select a context for the particular work process, wherein the control device 9 is configured to control the visualization system 8 in such a way that the process information relevant for the work process is visualized in a prioritized manner depending on the selected context. In this way, the amount of process information visualized through the visualization system 8 may be reduced so that the operator obtains an easier overview of an operating state of the agricultural work machine 1.

In one or some embodiments, information, such as process information, may be visualized in combination by the displays 10 and the window displays 11. For example, while the displays 10 and the window displays 11 are separate displays, the output of information on the various displays may be coordinated so that the information visualized may be perceived as coordinated by the operator. This is, for example, illustrated by FIGS. 4 and 5. These illustrate that graphic elements 30, which may be visualized through a display 10, may be supplemented by one or more graphic elements, such as a graphic element 32 which may be visualized through the window displays 11 that are laminated into the front window 3. In this case, the graphic element 32 may form a direct connection with the graphic elements 30 visualized by the display 10. Here, one of the graphic elements 30 visualized by the display 10 forms a first part 21 of an operating menu 20, while the graphic element 32 is formed here by a second part 22 of the operating menu 20 comprising a plurality of different pictograms. Each of these pictograms may be representative of another menu, wherein the operator is able to select between the individual menus by selecting one of the pictograms. This selection may be made in particular through the input device 7. In this regard, a single unitary illustration, such as operating menu 20, may be displayed via a plurality of graphic elements, so that at least one graphic element is visualized on a first display (such as one of display 10 or window displays 11) and at least another graphic element is visualized on a second display that is separate from the first display (such as the other of display 10 or window displays 11).

Figure 7:
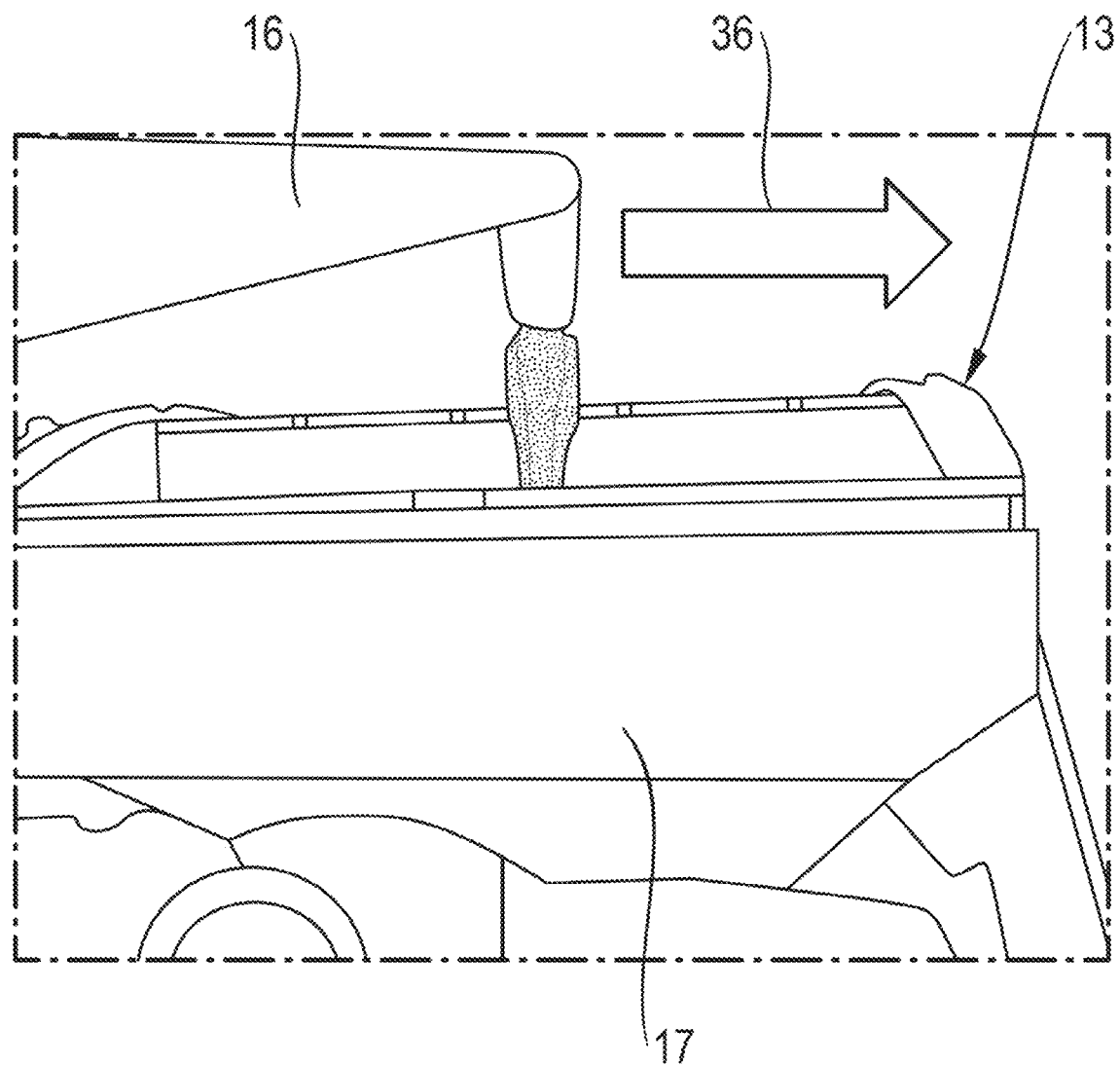
FIG. 7 illustrates a side view of a transport vehicle during a transfer process.
Figure 8:
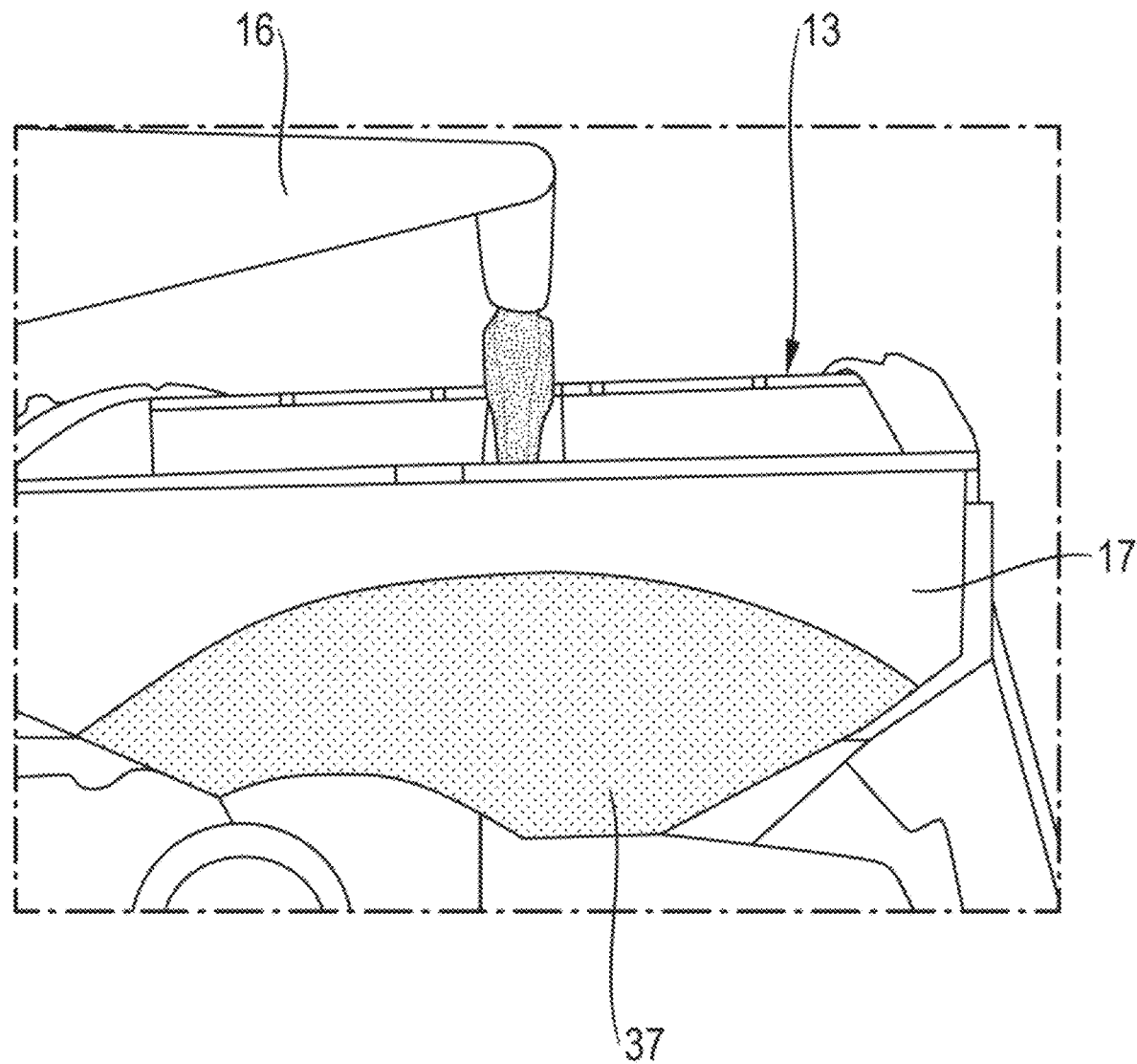
FIG. 8 illustrates the side view according to FIG. 7, but modified with virtual graphic elements.

In one or some embodiments, the agricultural work machine 1 may also comprise another sensor 33 arranged or positioned in a side region 15 (or side area) of the agricultural work machine 1. In one or some embodiments, the sensor 33 may comprise a camera. The sensor 33, which may be associated with a transfer device 16 of the agricultural work machine 1, may be oriented in such a way that a viewing cone 34 of the sensor 33 optically detects an area lying to the side of the agricultural work machine 1. In the course of a transfer loading process, harvested material, which may be temporarily stored in a grain tank 14 of the agricultural work machine 1, may be transferred to a transport vehicle 13. The latter may be formed here by a trailer pulled by an agricultural work machine 35, such as in the form of a tractor. In one or some embodiments, the sensor 33 is aligned with a lateral wall 17 of the transport vehicle 13. The visual information detected through the sensor 33 is transmitted to the control device 9 and, in the depicted example, is modified in such a way that modified visual information results. As discussed in more detail below, various types of modification are contemplated. As one example, modification may comprise supplementing an images, such as by using an overlay. Alternatively, or in addition, modification may comprise replacing a part of an image. The control device 9 may then control the visualization system 8 through which the changed visual information is visualized for the operator as process information. Examples of the result this may yield are illustrated in FIGS. 7 and 8. There, on the one hand, a virtual graphic element 36 is added (such as superimposed on an image), with the virtual graphic element 36 comprising an arrow. Other virtual graphic elements 36 are contemplated. In one or some embodiments, the remaining contents may reproduce the visual information as detected by the sensor 33. In the example of the sensor 33 comprising a camera which generates an image, the remaining contents may comprise some or all of the image generated by the camera. In this way, a part of the transfer device 16 as well as the transport vehicle 13 with its wall 17 are therefore recognizable. The virtual graphic element 36 may, for example, serve as a recommended action for the operator, wherein in the depicted example, the recommendation is made to move the transfer device 16 further to the right relative to the transport vehicle 13 in order to standardize a filling of the transport vehicle 13. In this regard, the virtual graphic element 36 may convey, in words and/or in symbols, information to the operator.

It is likewise contemplated that the wall 17 of the transport vehicle 13, which may be opaque, is visualized in a virtually transparent manner. For example, the modification of the image may overlay or replace the part of the image that comprises part or all of the wall 17 so that the operator is given the impression that he/she is "seeing" through the wall into the trailer. In particular, the operator may have, via the modification, the visual impression that he/she may look through the wall 17 into an interior space of the transport vehicle 13. In this way, the operator has the option of visually checking the harvested material 37 which is already transferred, and therefore a filling state of the transport vehicle 13. In this regard, the harvested material 37 as depicted in FIG. 8 is a virtual depiction of the actual harvested material in the transport vehicle 13 thereby modifying the underlying image. Thus, instead of merely providing an image of the interior space of the transport vehicle 13, the modification of the image provides the operator not only with the real context (e.g., the structure of the transport vehicle, such as a part of the wall) but also with the virtual context (e.g., "peering" into the transport vehicle 13 to "see" the amount of harvested material, as shown by the harvested material 37).

In the aforementioned examples, the visualization of the process information may be performed through the window display 11. In so doing, in one or some embodiments, it may be particularly advantageous if the process information is visualized depending on a viewing direction of the operator. In particular, it is contemplated that the operator, over the course of the transfer process, either turns his/her head to the side or aligns the entire driver's seat 6 about a vertical axis of rotation 28 towards the associated side window 4 which extends between the one A-pillar 23 and a B-pillar 27 behind it. The eye monitoring system 39 may detect that the operator is looking towards the side region 15 of the agricultural work machine 1, whereupon the "transfer device" context is automatically selected through the control device 9 for the selected transfer process. Relevant process information for this context may now be visualized in the side window 4 through the window displays 11 of the visualization system 8. No other process information need be visualized so that it is particularly easy for the operator to observe and monitor the loading of the transport vehicle 13 as a partial aspect of the transfer process.

Figure 9:
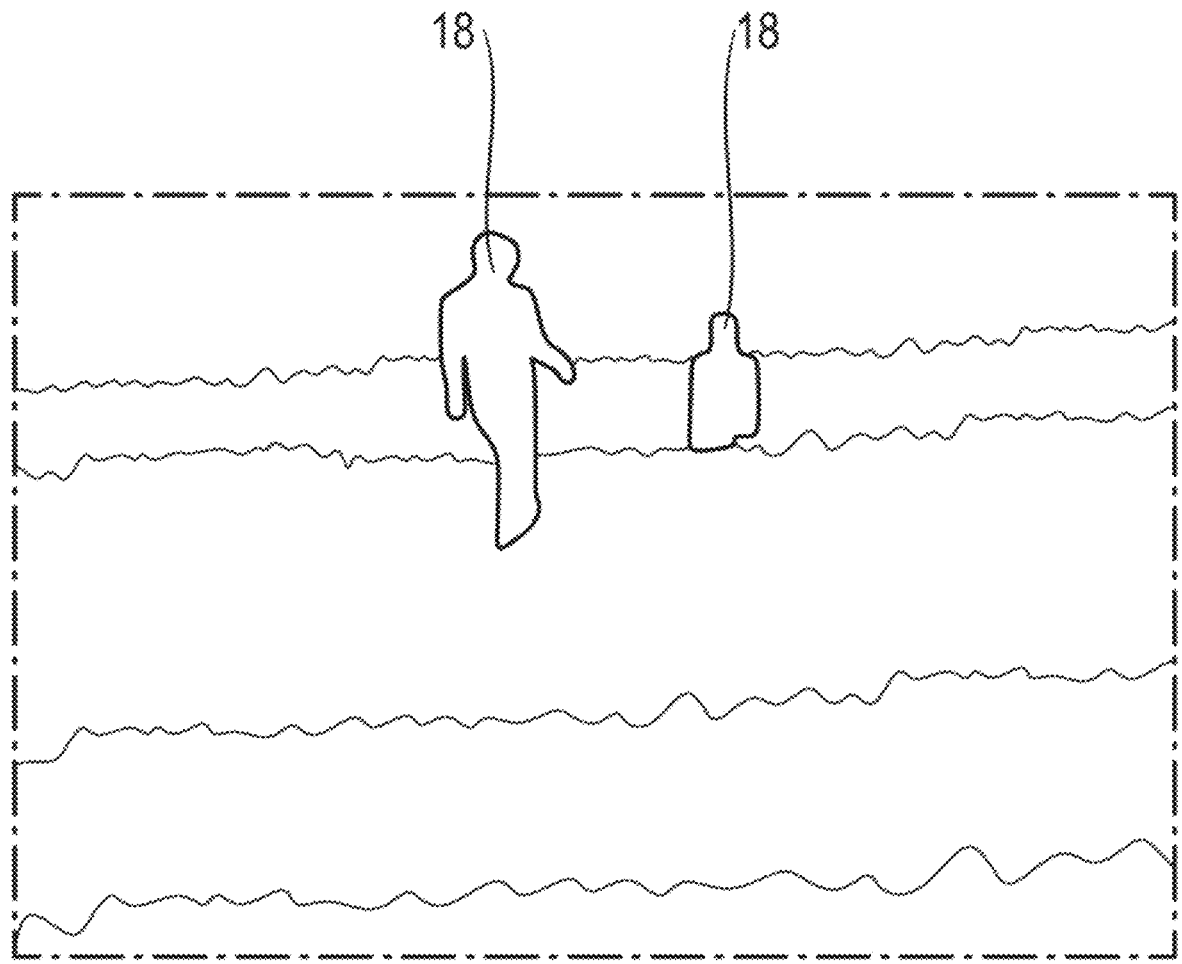
FIG. 9 illustrates a view of visualized information, wherein two objects are visualized in modified form.
Figure 10:
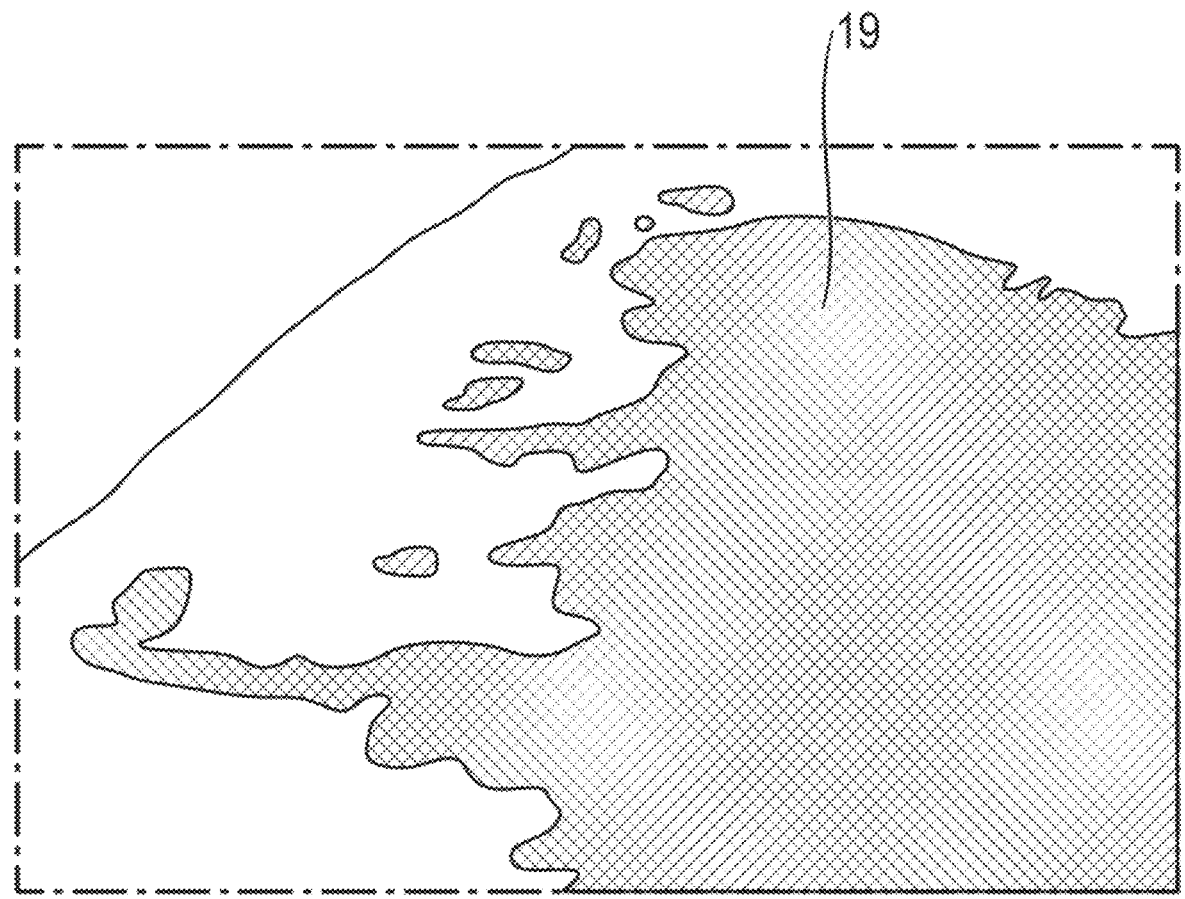
FIG. 10 illustrates a view of visualized information, wherein an area is visualized in modified form.
Figure 11:
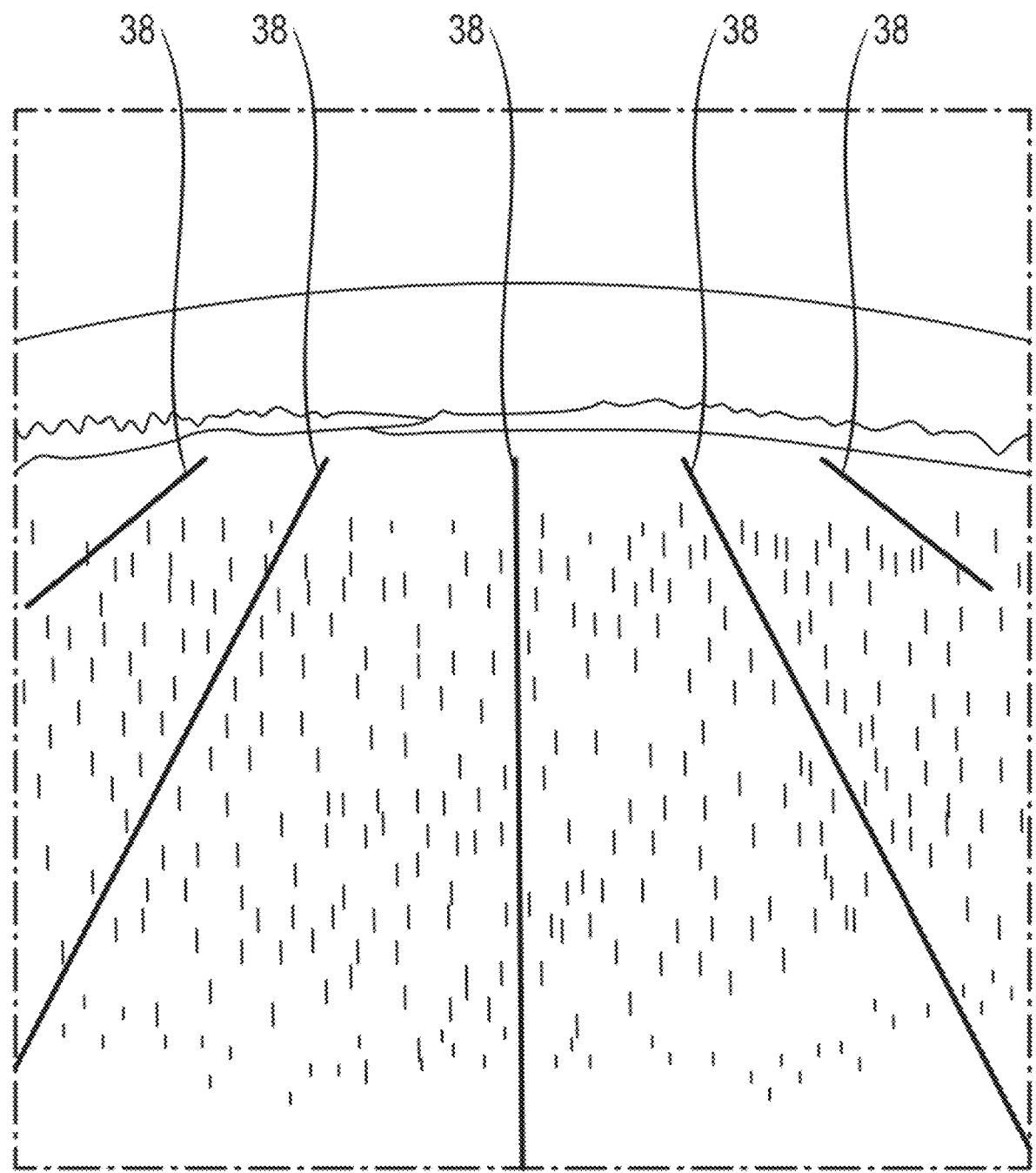
FIG. 11 illustrates a view of visualized information wherein graphical elements are added.

Furthermore, the control device 9 may be configured to change visual information that is detected through the sensor 12 arranged or positioned at the front. Corresponding examples are shown in FIGS. 9 to 11. In particular, real objects, for example persons or areas detected through the sensor 12, may be visualized in a modified form. In the shown example in FIG. 9, two persons 18 who are in a headland area of the agricultural work machine 1 are visualized in color so that they are particularly easy for the operator to recognize. As one example, persons 18 may first be detected in an image. After which, the image may be modified in order to highlight the persons detected (e.g., detecting the outline of the person and modifying the color of the outline of the person; detecting the person and replacing the image of the person with a stock image of a person). This may make it easier for the operator of the agricultural work machine 1 to identify objects in front of the agricultural work machine 1. In the depicted example in FIG. 10, an area 19 is visualized in color, which in this case includes a swampy subsoil that is difficult to drive over. Thus, FIG. 10 illustrates another type of modification of the image. For example, responsive to detecting an object, such as a section in an image corresponding to swampy subsoil, the control device 9 may change the pixel values in the section of the image corresponding to swampy subsoil, thereby changing the color of that section of the image to highlight the swampy nature of the subsoil. In this way, the operator may be prepared for ground conditions that may change and may take appropriate precautions. In the shown example in FIG. 11, the visual information acquired through the sensor 12 is enriched with graphical elements 38 that visualize for the operator a target driving path for the agricultural work machine 1 based on navigation data. The visual information from the camera is correspondingly enriched with virtual components, namely said graphic elements 38. In particular, the image may be supplemented with the graphic elements 38, such as by superimposing the graphic elements 38 onto the image (e.g., the control device 9 is configured to identify the portion(s), within the image, for the recommended driving path and to position the graphic elements 38 at the identified portion(s) within the image in order to indicate the recommended driving path to the operator). In this regard, the control device 9 is configured to perform the modification, such as the modification of the image in one of several ways, including any one, any combination, or all of: superimposing one or more graphic elements on an image; replacing one or more parts of the image with one or more graphic elements; modifying the image (e.g., changing pixel values for identified pixels for highlighting, such as swampy soil (see FIG. 10) or such as to highlight a person (see FIG. 9)).

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural work machine
2 Driver's cab
3 Front window
4 Side window
5 Interior space
6 Driver's seat
7 Input device
8 Visualization system
9 Control device
10 Display
11 Window display
12 Camera
13 Transport vehicle
14 Grain tank
15 Side area
16 Transfer device
17 Wall
18 Person
19 Area
20 Operating menu
21 Part
22 Part
23 A-pillar
24 Viewing cone
25 Headrest
26 Armrest
27 B-pillar
28 Axis of rotation
29 Control lever
30 Graphic element
31 Graphic element
32 Graphic element
33 Camera
34 Viewing cone
35 Agricultural work machine
36 Graphic element
37 Harvested material
38 Graphic element
39 Eye monitoring system
40 Processor
41 Memory

The invention claimed is:

1. An agricultural work machine comprising:
a driver's cab with an interior space spatially at least partially delimited by a front window and at least one side window;
a driver's seat positioned within the interior space;
an input device configured to enter input by an operator of the agricultural work machine;
an eye monitoring system configured to detect information of at least one eye parameter of the operator;
a visualization system configured to output visualizing information for the operator sitting on the driver's seat, the visualization system comprising at least one display positioned inside the driver's cab and at least one window display configured for outputting the visualizing information in or on one or both of the front window or the at least one side window; and
a control device in communication with the visualization system and the input device, wherein the input device is configured to transmit one or more entries to the control device, wherein the control device is configured to:
select at least one work process of the agricultural work machine by one or both of,
automatic analysis by the control device: or
responsive to manual input via the input device by the operator; and
determine process information based on the at least one work process selected;
receive the information of the at least one eye parameter;
using the information of the at least one eye parameter, detect one or both of: a viewing direction of the operator indicative of a location of a visualization: or an object of the process information; and
control, depending on the at least one work process selected, the visualization system so that the at least a part of the process information is one or both of visualized or prioritized over other visualizing information by:
visualizing the process information depending on one or both of the viewing direction of the operator or the object of the process information.

2. The agricultural work machine of claim 1, wherein the information of the at least one eye parameter of the operator comprises a detected viewing direction of the operator;
wherein the control device is configured to perform one or both of:
selecting, based on the detected viewing direction of the operator and from at least one of the at least one display or the at least one window display, a selected display for output; or
determining, based on the detected viewing direction of the operator, a part of the agricultural work machine or a transport vehicle configured to receive harvested material processed by the agricultural work machine that the operator is looking at; and
selecting, based on the part of the agricultural work machine or the transport vehicle that the operator is looking at, gaze-detected process information for output using the visualization system;
wherein the control device is configured to control the visualization system based on one or both of: the selected display for output or the selected gaze-detected process information for output using the visualization system.

3. The agricultural work machine of claim 2, wherein the control device is configured to perform both of:
   selecting, based on the detected viewing direction of the operator, the selected display for output; or
   determining, based on the detected viewing direction of the operator, the part of the agricultural work machine or the transport vehicle that the operator is looking at; and
   selecting, based on the part of the agricultural work machine or the transport vehicle that the operator is looking at, the gaze-detected process information for output using the visualization system; and
   wherein the control device is configured to control the visualization system based on both of: the selected display for output and the selected gaze-detected process information for output using the visualization system.

4. The agricultural work machine of claim 3, wherein, responsive to determining the part of the agricultural work machine or the transport vehicle that the operator is looking at, the control device is configured to place at least one overlay onto an image for output on the selected display; and
   wherein the at least one overlay is indicative of the gaze-detected process information.

5. The agricultural work machine of claim 4, wherein a transfer device is configured to pour the harvested material into the transport vehicle; and
   wherein, responsive to determining that the part of the agricultural work machine is the transfer device, the control device is configured to control the visualization system so that the at least one overlay is placed onto an image of the transport vehicle.

6. The agricultural work machine of claim 5, wherein the at least one overlay is indicative of one or both of: a fill level of the transport vehicle; or a direction to relocate the transfer device relative to the transport vehicle.

7. The agricultural work machine of claim 6, wherein the at least one overlay is indicative of both of: the fill level of the transport vehicle; and the direction to relocate the transfer device relative to the transport vehicle.

8. The agricultural work machine of claim 7, wherein the control device is configured to modify the image by performing one or both of replacing or supplementing real components that are opaque in the image with the at least one overlay in such a way that the real components that are opaque are visualized as being at least partly transparent by the replacing or the supplementing of the image.

9. The agricultural work machine of claim 3, wherein the at least one side window comprises a first side window have a first respective side and a second side window have a second respective side;
   wherein the control device is configured to determine, based on the detected viewing direction of the operator, which, of the first respective side or the second respective side, the operator is viewing; and
   wherein the control device is configured to select a respective window display as the selected display responsive to determining which of the first respective side or the second respective side the operator is viewing.

10. The agricultural work machine of claim 1, wherein the control device is configured to control the visualization system in order to coordinate output of an operator interactive input across both of the at least one display and the at least one window display.

11. The agricultural work machine of claim 1, further comprising at least one sensor configured to generate data indicative of an environment of the agricultural work machine through which to detect visual information and to transmit the data to the control device;
   wherein the control device is further configured to: analyze the data in order to detect the visual information and to control the visualization system in order to output an indicator of the visual information;
   wherein the data comprises an image; and
   wherein the control device is configured to modify the image based on the analysis of the image and to control the visualization system to output the modified image.

12. A method for operating an agricultural work machine, the agricultural work machine comprising a driver's cab with an interior space spatially at least partially delimited by a front window and at least one side window; a driver's seat positioned within the interior space; an input device configured to enter input by an operator of the agricultural work machine; a visualization system configured to output visualizing information for the operator sitting on the driver's seat, the visualization system comprising at least one display positioned inside the driver's cab and at least one window display configured for outputting the visualizing information in or on one or both of the front window or the at least one side window; and a control device in communication with the visualization system and the input device, wherein the input device is configured to transmit one or more entries to the control device, the method comprising:
   selecting at least one work process of the agricultural work machine based on the one or more entries transmitted from the input device, wherein the at least one work process is selected automatically or manually by the operator;
   determining process information based on the at least one work process selected;
   using information of at least one eye parameter of the operator, detecting one or both of: a viewing direction of the operator indicative of a location of a visualization; or an object of the process information; and
   controlling, depending on the at least one work process selected, the visualization system so that the at least a part of the process information is one or both of visualized or prioritized over other visualizing information by:
      visualizing the process information depending on one or both of the viewing direction of the machine operator or the object of the process information.

13. The method of claim 12, further comprising:
    performing both of:
    (A) selecting, based on the detected viewing direction of the operator and from at least one of the at least one display or the at least one window display, a selected display for output; and
    (B.1) determining, based on the detected viewing direction of the operator, a part of the agricultural work machine or a transport vehicle configured to receive harvested material processed by the agricultural work machine that the operator is looking at; and
    (B.2) selecting, based on the part of the agricultural work machine or the transport vehicle that the operator is looking at, gaze-detected process information for output using the visualization system; and
    wherein controlling the visualization system is based on both of: the selected display for output and the selected gaze-detected process information for output using the visualization system.

14. The method of claim 13, wherein, responsive to determining the part of the agricultural work machine or the transport vehicle that the operator is looking at, placing at least one overlay onto an image for output on the selected display; and wherein the at least one overlay is indicative of the gaze-detected process information.

15. The method of claim 14, wherein a transfer device is configured to pour the harvested material into the transport vehicle; and wherein, responsive to determining that the part of the agricultural work machine is the transfer device, controlling the visualization system so that the at least one overlay is placed onto an image of the transport vehicle.

16. The method of claim 15, wherein the at least one overlay is indicative of both of: a fill level of the transport vehicle; and a direction to relocate the transfer device relative to the transport vehicle.

17. The method of claim 16, wherein the image is modified by performing one or both of replacing or supplementing real components that are opaque in the image with the at least one overlay in such a way that the real components that are opaque are visualized as being at least partly transparent by the replacing or the supplementing of the image.

18. The method of claim 13, wherein the at least one side window comprises a first side window have a first respective side and a second side window have a second respective side;

further comprising determining, based on the detected viewing direction of the operator, which, of the first respective side or the second respective side, the operator is viewing; and wherein a respective window display is selected as the selected display responsive to determining which of the first respective side or the second respective side the operator is viewing.

19. The method of claim 12, wherein information is visualized in combination on the at least one display and the at least one window display of the visualization system;

wherein one or more visualization areas of the at least one display and of the at least one window display are connected to one another in such a way that at least one content visualized through the visualization system is visualized in part by the at least one display and in part by the at least one window display.

20. The method of claim 19, wherein a first part of an operating menu is visualized by the at least one display; and wherein a second part of the same operating menu is visualized through the at least one window display.

* * * * *